United States Patent [19]

Haytayan

[11] 4,098,295
[45] Jul. 4, 1978

[54] CONTROL VALVES

[75] Inventor: Harry M. Haytayan, Lincoln, Mass.

[73] Assignee: Pneutek, Inc., Billerica, Mass.

[21] Appl. No.: 754,733

[22] Filed: Dec. 27, 1976

[51] Int. Cl.² .......................... F16K 1/44; F16K 1/38
[52] U.S. Cl. ........................ 137/625.27; 251/356; 251/361
[58] Field of Search ............. 137/625.5, 625.27; 251/368, 356, 361, 360

[56] References Cited

U.S. PATENT DOCUMENTS

| 2,682,386 | 6/1954 | Lindsay | 137/625.27 X |
| 2,782,801 | 2/1957 | Ludwig | 251/356 X |
| 3,043,335 | 7/1962 | Hunt | 137/625.5 X |
| 3,089,507 | 5/1963 | Drake et al. | 137/625.27 X |
| 3,108,779 | 10/1963 | Anderson | 251/368 X |
| 3,382,894 | 5/1968 | Shurtleff et al. | 137/625.5 |
| 3,531,086 | 9/1970 | Shannon | 251/356 |

FOREIGN PATENT DOCUMENTS

| 578,932 | 7/1946 | United Kingdom | 251/356 |

Primary Examiner—Arnold Rosenthal
Attorney, Agent, or Firm—Schiller & Pandiscio

[57] ABSTRACT

A simple and rugged three-way valve is disclosed which may be used as a trigger-operated control valve for portable pneumatic tools. The valve utilizes a novel valve member slidably disposed in a valve chamber for reciprocal movement between two valve seats and is arranged so that it cannot obstruct a side port that is located between the valve seats.

14 Claims, 3 Drawing Figures

CONTROL VALVES

BACKGROUND OF THE INVENTION

1. Field of the Invention

This invention relates to valves in general and in particular to control valves for use with pneumatic devices.

2. Description of the Prior Art

Many pneumatic devices require control valves that are cheap, reliable and rugged. Heretofore it has been proposed to employ a three-way ball valve of the type comprising a valve body having two axially spaced ports, a valve seat associated with each of those ports, a third port located between the other two ports, a valve member in the form of a ball which is free to move between the two valve seats and an actuating pin for urging the ball against one of the two valve seats. Such a valve is disclosed in U.S. Pat. No. 3,927,459 as the trigger-operated control valve for a pneumatic impact tool used to drive nails. However, while such a ball valve has certain advantages, it also has disadvantages. For example, it suffers from the limitations that its operation is not sufficiently precise and that the ball member may occasionally tend to impede the full flow of fluid through the side port when it is disposed intermediate of its two valve seats.

Another problem with control valves of the type shown in U.S. Pat. No. 3,927,459 is the lack of reliability in the resilient seals which serve as the valve seats. There is a tendency for the seals, which typically are washers made of an elastomer such as neoprene, butyl rubber or silicone rubber, to delaminate from its mount, i.e., to separate from the surface of the valve to which it is attached. In control valves of the type shown in U.S. Pat. No. 3,927,459, the seals 94 and 96 which are engaged by the valve member in its upper and lower positions are usually attached to their mount by a cement and/or a friction fit. As a consequence of the cycling of air that occurs when the valve is operated, however, the high pressure air will tend to intrude under the seals wherever there is a gap or weakness in the bond between the seals and their supporting surfaces and thereby cause the seals to separate or otherwise shorten their expected life.

OBJECTS OF THE PRESENT INVENTION

Consequently, the primary object of this invention is to provide a control valve which has substantially all of the advantages and also improves upon control valves of the type shown in said U.S. Pat. No. 3,927,459.

A more specific object is to provide a control valve which is equipped with new and improved seals that will not separate from their supporting surfaces and which comprises a valve member that is shaped to provide excellent seating, is self-guiding and will not bind in its chamber, cannot obstruct the side port of the valve, and has a short operating stroke and assures full fluid flow and quick response.

SUMMARY OF THE INVENTION

These and other objects which are hereinafter described or rendered obvious are achieved by providing a valve which comprises one resilient valve seal which is molded to the reciprocal valve member and another resilient valve seal which serves as a valve seat and is secured in place by clamping it between the valve body and the tool or other device to which the valve is attached. The preferred embodiment of the invention is a control valve comprising a valve body with at least three ports, a slide valve assembly comprising a valve member with opposed seating surfaces, and first and second valve seats disposed so that (1) a first port is blocked off when one valve seat is engaged by one of the seating surfaces of the valve member, (2) a second port is blocked off when the other valve seat is engaged by the other seating surface of the valve member, and (3) the valve member passes by the third port as it moves from one seat to the other. The valve member is shaped and sized so as to minimize interference with flow through the third port and also to make a close sliding fit with the surrounding portion of the valve body.

BRIEF DESCRIPTION OF THE DRAWINGS

Further objects, the nature and many of the advantages of the present invention will be more fully described or rendered obvious in the course of the following detailed description, which is to be considered together with the accompanying drawings wherein like numbers refer to like parts and further wherein.

DETAILED DESCRIPTION OF THE INVENTION

Figure 1:
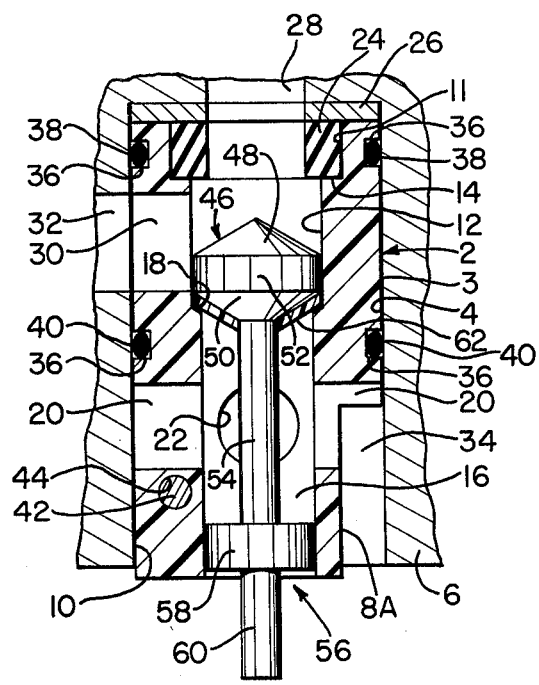
FIG. 1 shows a side view in partial longitudinal section of one embodiment of the present invention.
Figure 2:
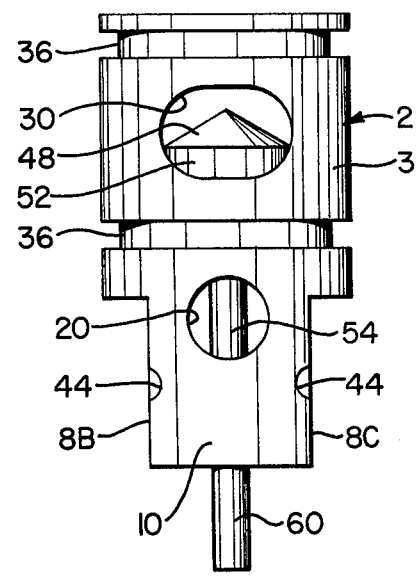
FIG. 2 shows a side view in elevation of the same valve rotated 90° from FIG. 1.

Referring first to FIG. 1, it may be seen that the illustrated valve comprises a hollow valve casing 2 in which is slidably disposed a valve member 46, hereinafter described in detail. Casing 2 has a cylindrical outer surface 3 so that the valve may be inserted into a round bore 4 formed in a part of the wall 6 of the housing of a tool or other device with which the valve is to be used, e.g. a tool as shown in U.S. Pat. No. 3,927,459 or 3,711,008. The bottom portion of cylindrical outer surface 3 is cut away in such a manner that it forms four discrete sides, three of the sides being identical flat surfaces 8A, 8B and 8C adjoining one another at right angles, and the fourth side 10 being a 90° arc of the cylindrical outer surface 3 of valve casing 2.

A circular bore 11 extends axially downward from the top of valve casing 2, meeting a coaxial circular bore 12 of smaller diameter. Hence at the inner end of bore 11 the valve casing has an annular shoulder 14. A circular bore 16 rises coaxially from the bottom of valve casing 2 so as to join circular bore 12. Bore 16 has a smaller diameter than circular bore 12, and is joined to the latter by a frusto-conical annular shoulder 18. Shoulder 18 serves as a valve seat for valve member 46 when the latter is in its "down" position.

A circular bore 20 extends diametrically of valve casing 2 and completely penetrates the casing so as to be open on both ends. It runs from surface 10 to surfaces 3 and 8A, striking the latter perpendicularly. Another circular bore 22 lies on the same plane as bore 20 and intersects it perpendicularly, completely penetrating valve casing 2 so as to be open on both ends. Circular bores 16, 20 and 22 intersect one another at right angles.

Set into circular bore 11 is a resilient ring 24 which serves as a valve seat for the valve member 46 when the latter is in its "up" position. Ring 24 is sized so that in its as-formed state its axial dimension is slightly greater than the length of bore 11. It rests upon and overlaps annular shoulder 14 as shown. Ring 24 is preferably, though not necessarily, comprised of an elastomer having a hardness of 60–70 durometer on the A scale. Ring 24 makes a close fit with valve casing 2. Disposed between the upper end of valve casing 2 and the tool housing wall 6, is a circular metal washer 26. Washer 26 has an outside diameter which is larger than the diameter of bore 11 and preferably is nearly equal in size to the outside diameter of valve casing 2. The inner diameter of washer 26 is preferably identical in size to the inner diameter of ring 24, though it may be larger or smaller. Washer 26 serves to compress ring 24 and hold it tight against annular surface 14. A circular passageway or port 28, having a diameter preferably identical in size to the inner diameter of washer 26, is provided in housing wall 6 in alignment with the passageway defined by the inner surface of ring 24. In the typical installation of the valve, port 28 serves as an inlet for conducting high pressure air from the tool into the interior of the valve. In this manner port 28, washer 26 and ring 24 form an isodiametric passageway leading from a high pressure air chamber (at the other end of port 28) into circular bore 12.

Further down valve casing 2 is a side port 30 which extends radially from bore 12 to a port 32 in housing wall 6. In the installation, port 32 leads to a pressure-operated mechanism (not shown) which, for example, might be a poppet valve as described in U.S. Pat. No. 3,711,008. Near the bottom of casing 2 is an air vent passageway 34 which serves to connect to the atmosphere the side openings formed in the valve body by bores 20 and 22. Passageway 34 is formed by the gaps between the three side surfaces 8A, 8B ane 8C of casing 2 and housing wall 6.

Valve casing 2 has two axially spaced peripheral grooves 36 to accomodate resilient O-rings 38 and 40, which serve to prevent the pressurized operating fluid, such as air, from leaking out between casing 2 and the surrounding tool housing wall 6. Valve casing 2 is secured in place by a variety of convenient means, e.g. by a locking pin 42 which extends through a transverse lock bore 44 in casing 2 and has one or both of its ends received in holes in housing wall 6, so that washer 26 is caused to clamp ring 24 tightly against shoulder 14.

A valve member 46 is disposed in circular bore 12. This member has an upper conical surface 48 and a lower frusto-conical surface 50, which come together at a relatively narrow cylindrical edge surface or rim 52. Seat 18 extends at substantially the same angle as surface 50 as shown. As viewed in cross-section, rim 52 may be rounded or sharply angular or even be tapered to almost a knife edge, but preferably it is a cylindrical surface as shown. Valve member 46 is sized so as to form a close sliding fit in circular bore 12. Typically, the diameter of rim 52 is between about 0.001 to about 0.005 inch less than the diameter of the surrounding inner surface of the valve casing. This not only provides a good sliding fit but also assures that the valve member will not jam in the casing and that little or no air can leak between rim 52 and the surrounding wall which defines circular bore 12.

Attached to frusto-conical surface 50 is a stem 54, which is in turn attached to a valve rod assembly 56. This assembly comprises a piston 58, which is sized so as to make a close sliding fit in circular bore 16, and a rod 60 leading out of circular bore 16. Preferably the diameter of piston 58 is less than the diameter of the surrounding surface of the valve casing by between about 0.001 and about 0.005 inch. Piston 58 serves primarily to keep valve rod assembly 56 and valve member 46 aligned within the axis of circular bores 16 and 12 respectively. Preferably, but not necessarily, valve member 46, stem 54 and valve rod assembly 56 are made as an integral unit from one piece of metal.

Attached to frusto-conical surface 50 is a layer 62 of a resilient, tear-resistant material which preferably but not necessarily has a hardness of 60–70 durometer on the A scale. Layer 62 acts as a resilient seal for the valve member when the latter is in its "down" position, as described in greater detail below. Layer 62 may be made of various materials, including a natural or synthetic rubber, but preferably it is a polyurethane materal. Polyurethanes are described in U.S. Pat. No. 3,941,855 and other patents and technical publications. Plastic material other than polyurethane may be used. By way of example but not limitation, layer 62 may be approximately 1/16th inch in thickness. Layer 62 covers substantially the entire frusto-conical surface 50 and preferably part of stem 54.

Layer 62 is molded in place onto the preformed valve member and is bonded to valve member 46 and stem 54 as part of the molding operation.

By way of example, the layer 62 is formed of a polyurethane material by mixing a polyisocyanate with a polyol, heating that mixture to about 95° C, stirring the mixture at that temperature in a vacuum for a suitable time, e.g. 15–30 minutes, to remove air and the gases produced by reaction of the two components, adding a catalyst such as a tertiary amine to the mixture at about 85° C, and then molding the reaction mixture to the valve member to form layer 62. If desired, surface 50 and the upper end of the valve stem may be pretreated with a selected bonding agent to improve adhesion of the molded polyurethane layer.

Now as a person skilled in the art will readily understand, if a stream of pressurized fluid is introduced into the valve via port 28, valve member 46 will be driven away from port 28 and forced into seating engagement with annular shoulder 18. While pressed against shoulder 18 in this "down" position, the resilient polyurethane layer 62 will act as a seal to effectively prevent pressurized fluid from escaping past annular shoulder 18 to the outside atmosphere via bores 20 and 22 and air vent passageway 34. Instead, all of the pressurized fluid will be directed out of opening 30, through port 32 and on to the pressure-operated mechanism.

If however, valve assembly 56 is directed upwards, e.g. by means of a trigger member as shown in U.S. Pat. No. 3,927,459, valve member 46 will move off the valve seat formed by annular shoulder 18 and thereby allow pressurized fluid at port 32 to escape to the outside atmosphere via circular bores 20 and 22 and air vent passageway 34. So long as valve member 46 is not seated against annular shoulder 18, any high-pressure fluid entering the valve via port 28 will be leaked to the outside atmosphere. The rate of flow of air out of the valve via vent passageway 34 will be relatively insignificant until the upper edge of seal 62 moves up high enough (as viewed in FIG. 1) to clear the lower portion of opening 30. Shoulder 18 is located so that the valve member must be raised a short but definite and unvarying distance before the upper edge of seal 62 clears the lower side of opening 32. Should valve member 46 be moved far enough upwards so that conical surface 48 firmly seats on resilient ring 24, i.e. into the "up" position, an effective seal will be made against any fluid entering the valve via 28.

Figure 3:
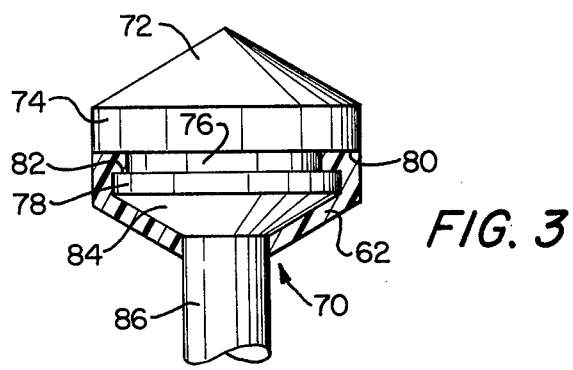
FIG. 3 shows a side view in partial longitudinal section of a preferred embodiment of the valve head.

While the valve head embodiment shown in FIG. 1 is effective, a preferred valve head 70 is shown in FIG. 3. As may be seen from the drawings, valve head 70 is similar to member 46 in that it retains the general shapes of surfaces 48 and 52 in surfaces 72 and 74, respectively. However, in this case the valve head is formed with two additional cylindrical surfaces 76 and 78 and two annular shoulders 80 and 82. Surfaces 74, 76 and 78 are all coaxial, with surface 74 having a greater circumference than surface 78, which in turn has a greater circumference than surface 76. In this way annular shoulder 80 is formed where surface 74 overlaps surface 76 and shoulder 82 is formed where surface 78 overlaps surface 76. As the drawings indicate, surface 76 and shoulders 80 and 82 essentially form a groove in the outer wall of valve head 70. Member 70 also has a frusto-conical surface 84 which extends between surface 78 and a stem 86. Resilient material 62, preferably though not necessarily polyurethane, is molded to valve head 70 on surfaces 76, 78, 80, 82, 84 and 86 and forms a valve seal in essentially the same manner as it does with the embodiment shown in FIG. 1. The preferred embodiment, however, has the advantage that the groove formed in the valve head by surface 76 and annular shoulders 80 and 82 allows the material 62 to mold much more securely around the valve head. This groove offers greatly improved mechanical interlocking between valve head 70 and resilient material 62, as well as greatly increased surface area for bonding the material 62 onto the valve head and stem. As with rim 52 and seal 62 of FIG. 1, the combined length of the cylindrical surface 74 and the outer cylindrical surface of seal 62 of the valve head 70 (the vertical dimension as seen in FIG. 3) is substantially less than the diameter of valve opening 30. Hence in any of its possible positions between shoulder 18 and valve seat 24, valve head 70 cannot fully obstruct opening 30, and air can flow from port 32 to passageway 34 so long as the valve member is disengaged from seat 18 as described in connection with the embodiment of FIG. 1.

As is believed obvious, the stroke through which valve member 46 is required to be moved to close off port 28 is relatively short and can be accomplished very quickly.

MODIFICATIONS OF THE ILLUSTRATED EMBODIMENTS

It should be noted that the embodiments illustrated and described herein are intended solely for the sake of example and clarity and are to be in no way construed as limiting the scope of the present invention, since various alterations may be carried out on the illustrated embodiments without departing from the essential features of this invention.

Thus, for example, one contemplated modification of the illustrated embodiments is the roughening of the valve head and stem surfaces to which the resilient material 62 is attached prior to the molding operation. This roughening, which may comprise a pebbling of the surfaces by sand blasting and/or the formation of grooves or ridges along the surfaces, will further improve the mechanical interlocking between the valve head and stem and the resilient material 62.

Another possible modification is to alter the external geometry of valve casing 2 to something other than essentially round, e.g. square or triangular. Also contemplated is modifying the annular shoulder 18 so that it extends at a right angle to stem 54. Furthermore, the leading tip of surfaces 48 and 70 may be rounded off. Also, although the valve casing 3 is preferably made of a plastic material, it may be made of another suitable material, e.g. anodized aluminum.

These and other changes of their kind are foreseen as readily obvious to one skilled in the art.

ADVANTAGES OF THE PRESENT INVENTION

There are numerous advantages to using valves made in accordance with this invention. First, the new valve head provides better seating characteristics than the ball member shown in U.S. Pat. No. 3,927,459. Second, the valve head design helps assure that full flow of fluid can occur through the side port when the valve head is disposed intermediate of its two seats. And third, the new valve member seals utilized in the present design are more resistant to separation or delamination than seals used in valves already referred to. By molding layer 62 directly onto the valve member, a superior attachment is formed between the layer and valve member which is sufficiently secure to effectively prevent delamination of the resilient layer 62. Similarly the ring 24, while not adhesively bonded to valve casing 2, is nevertheless tightly secured by virtue of the fact that it is captivated between shoulder 14 and washer 26, with the latter itself being captivated between the upper end surface of valve casing 2 and the adjacent annular surface formed by tool housing 6. By making the ring 24 slightly greater in dimension than the axial length of bore 11, the ring is compressed between the metal washer 26 and annular shoulder 14 when the valve casing is captivated in the bore 4 formed in the tool housing 6. This compression of ring 24 assures intimate contact between its outer and bottom surfaces and the adjacent surfaces defining bore 11 and shoulder 14. As a consequence, ring 24 cannot be dislodged and thereby impede operation of the valve.

What is claimed is:

1. A control valve comprising:
    a hollow valve casing having (1) a bore for accommodating a slide valve unit, said bore having an enlarged section defining a valve chamber, (2) first, second and third openings for conducting flow of fluid into and out of said casing via said valve chamber, and (3) first and second axially aligned valve seats at opposite ends of said valve chamber, said first valve seat being a ring that is comprised of a resilient material so as to act as a fluid seal and is located in a counterbore of said bore at said first opening, and said second valve seat being located between said second and third openings; and
    a slide valve unit having a valve stem slidably disposed within said bore and a valve head attached to the inner end of said stem and movable by said stem into engagement alternately with said first and second valve seats, said valve head having (1) a first conically tapered section for contacting and making a fluid seal with said first seat, and (2) a second frusco-conical section including a peripheral groove and a resilient coating disposed within said groove and covering said second section for contacting and providing a fluid seal with said second valve seat.

2. A valve according to claim 1 wherein said valve head is arranged so that (1) its periphery makes a close sliding fit with a surrounding portion of said valve casing, (2) fluid pressure applied via said first opening will force said valve head away from said first valve seat toward said second valve seat, (3) when it is engaged with either said first or second valve seat it will block all flow of fluid through said first or second opening respectively, and (4) at all positions along its path of travel between the two valve seats it is incapable of blocking fluid flow into or out of said valve casing via said third opening.

3. A control valve according to claim 1 wherein said first opening is at one end of said bore and said second and third openings intersect said bore.

4. A control valve according to claim 1 wherein said resilient coating is made of a plastic material.

5. A control valve according to claim 1 wherein said valve head frusco-conical section is roughened to provide mechanical interlocking between said valve head surfaces and the resilient material.

6. A control valve according to claim 1 wherein said valve head is generally diamond-shaped in longitudinal section.

7. A control valve according to claim 6 wherein said second valve seat has sloped surfaces lying essentially parallel to the mating surfaces of said valve head.

8. a control valve according to claim 1 wherein said slide valve unit comprises a piston disposed within and making a close sliding fit with said bore.

9. In combination with a tool having a port with a shoulder in said port, a control valve comprising a hollow valve casing disposed in said port, said casing having (1) a bore for accommodating a slide valve unit with said bore having an enlarged section defining a valve chamber, (2) first, second and third openings for conducting flow of fluid into and out of said casing via said valve chamber, and (3) first and second axially aligned valve seats at opposite ends of said valve chamber, said first valve seat being comprised of a resilient ring located in a counterbore of said bore at said first opening and said second valve seat being located between said second and third openings, said ring being captivated between (1) a first annular shoulder which is formed along the bore and engages one side of said ring and (2) a washer which engages a second opposite side of said ring and is captivated between an end surface of said valve casing and the shoulder in said bore; and a slide valve unit having a valve stem slidably disposed within said bore and a valve head attached to the inner end of said stem and movable by said stem into engagement alternately with said first and second valve seats, said valve head being sized so that (1) it makes a close sliding fit at its periphery with a surrounding portion of said valve casing, (2) fluid pressure applied via said port and said first opening will force said valve head away from said first valve seat toward said second valve seat, (3) when it is engaged with either said first or second valve seat it will block flow of fluid through said first or second opening respectively, and (4) at all positions along its path of travel between the two valve seats it is incapable of blocking flow of fluid into or out of said valve casing via said third opening.

10. A control valve according to claim 9 wherein said valve head is generally diamond-shaped in longitudinal section.

11. A control valve according to claim 10 wherein said second valve seat has a sloped surface lying essentially parallel to a mating surface of said valve head.

12. A control valve according to claim 9 wherein valve head is provided with a resilient coating along those surfaces which contact said second valve seat so as to establish a fluid seal when engaged with said second valve seat.

13. A control valve according to claim 9, wherein said valve head comprises (1) a first conically tapered section for contacting and making a fluid seal with said first seat, and (2) a second frusco-conical section which is covered by a resilient coating for contacting and making a seal with said second seat.

14. A control valve according to claim 13, wherein said valve head has a groove and said resilient coating extends into said groove.

* * * * *